(12) United States Patent
Faro

(10) Patent No.: US 11,369,974 B2
(45) Date of Patent: Jun. 28, 2022

(54) APPARATUS AND METHOD FOR AUTOMATIC PLANT TRIMMING TUMBLER

(71) Applicant: Michael Faro, Campbell, CA (US)

(72) Inventor: Michael Faro, Campbell, CA (US)

(*) Notice: Subject to any disclaimer, the term of this patent is extended or adjusted under 35 U.S.C. 154(b) by 54 days.

(21) Appl. No.: 16/782,645

(22) Filed: Feb. 5, 2020

(65) Prior Publication Data

US 2020/0281126 A1    Sep. 10, 2020

Related U.S. Application Data

(60) Provisional application No. 62/801,565, filed on Feb. 5, 2019.

(51) Int. Cl.
| | |
|---|---|
| *B02C 23/38* | (2006.01) |
| *B02C 18/18* | (2006.01) |
| *B02C 23/30* | (2006.01) |
| *B02C 18/14* | (2006.01) |
| *B02C 18/22* | (2006.01) |
| *B02C 18/24* | (2006.01) |
| *B02C 21/00* | (2006.01) |
| *B02C 25/00* | (2006.01) |
| *B02C 23/24* | (2006.01) |
| *A01G 3/08* | (2006.01) |
| *B65G 43/08* | (2006.01) |
| *B65G 43/10* | (2006.01) |
| *B65G 47/50* | (2006.01) |
| *B65G 47/91* | (2006.01) |
| *B65G 65/02* | (2006.01) |
| *A01G 3/00* | (2006.01) |

(52) U.S. Cl.
CPC .......... *B02C 23/38* (2013.01); *A01G 3/00* (2013.01); *A01G 3/085* (2013.01); *B02C 18/144* (2013.01); *B02C 18/145* (2013.01); *B02C 18/18* (2013.01); *B02C 18/186* (2013.01); *B02C 18/2216* (2013.01); *B02C 18/24* (2013.01); *B02C 21/007* (2013.01); *B02C 23/24* (2013.01); *B02C 23/30* (2013.01); *B02C 25/00* (2013.01); *B65G 43/08* (2013.01); *B65G 43/10* (2013.01); *B65G 47/50* (2013.01); *B65G 47/917* (2013.01); *B65G 65/02* (2013.01); *A01G 2003/005* (2013.01); *B65G 2201/0202* (2013.01); *B65G 2203/0233* (2013.01); *B65G 2203/0241* (2013.01)

(58) Field of Classification Search
CPC ......... B02C 23/20; B02C 18/02; B02C 18/16; B02C 25/00; A23N 15/02; A01G 3/00
See application file for complete search history.

(56) References Cited

U.S. PATENT DOCUMENTS

| 1,336,991 A | * | 4/1920 | Urschel | ................. | A23N 15/12 |
| | | | | | 99/636 |
| 4,433,769 A | * | 2/1984 | Scuccato | ................. | B02C 17/24 |
| | | | | | 477/5 |

(Continued)

Primary Examiner — Faye Francis

(57) ABSTRACT

Embodiments of the present invention pertain to a tiltable tumbler for use in a plant trimming machine. Plants are placed in a tumbler. As the tumbler rotates, leaves extending through slots in the tumbler by a vacuum are trimmed off. A mechanism is used to adjust the tilt of the tumbler. Thereby, the rate by which the plant material in the tumbler is processed is faster with a higher tilt or slower with a lower tilt. The degree of tilt is adjustable either manually or automatically via a computer.

17 Claims, 17 Drawing Sheets

(56) References Cited

U.S. PATENT DOCUMENTS

| | | | | |
|---|---|---|---|---|
| 4,452,400 | A * | 6/1984 | Williams | B02C 18/24 |
| | | | | 241/236 |
| 8,757,524 | B2 * | 6/2014 | Mosman | A01G 3/00 |
| | | | | 241/30 |
| 9,161,566 | B2 * | 10/2015 | Hall | B26D 1/36 |
| 9,636,838 | B2 * | 5/2017 | Evans | B26D 7/2614 |
| 9,682,488 | B2 * | 6/2017 | Beyerlein | A01G 3/00 |
| 10,322,416 | B2 * | 6/2019 | Fader | B02C 19/08 |
| 10,415,740 | B2 * | 9/2019 | Evans | B26D 7/0641 |
| 10,842,080 | B2 * | 11/2020 | Ingram | A01G 3/00 |
| 10,857,542 | B2 * | 12/2020 | Ingram | A01G 3/00 |
| 11,089,731 | B2 * | 8/2021 | Harold | A01G 3/00 |
| 11,097,282 | B2 * | 8/2021 | Hall | A23N 15/02 |
| 2005/0193770 | A1 * | 9/2005 | Schoonhoven | B02C 25/00 |
| | | | | 65/29.12 |
| 2012/0279193 | A1 * | 11/2012 | Mosman | A01G 3/00 |
| | | | | 56/233 |
| 2013/0175372 | A1 * | 7/2013 | Mosman | A01G 3/002 |
| | | | | 241/25 |
| 2014/0196587 | A1 * | 7/2014 | Beyerlein | A01G 3/08 |
| | | | | 83/312 |
| 2015/0290827 | A1 * | 10/2015 | Evans | B26D 1/40 |
| | | | | 83/698.11 |
| 2018/0306377 | A1 * | 10/2018 | Evans | B26D 7/0641 |
| 2019/0224687 | A1 * | 7/2019 | Ingram | B02C 17/002 |
| 2019/0388902 | A1 * | 12/2019 | Hall | B02C 18/062 |
| 2020/0281127 | A1 * | 9/2020 | Faro | B02C 21/007 |

\* cited by examiner

US 11,369,974 B2

APPARATUS AND METHOD FOR AUTOMATIC PLANT TRIMMING TUMBLER

CROSS-REFERENCE TO RELATED APPLICATIONS

This application claims the benefit of and priority to U.S. Provisional Application No. 62/801,565, filed on Feb. 5, 2019, which is hereby incorporated by reference in its entirety.

FIELD OF THE INVENTION

Embodiments according to the present invention relate to a method and device for a plant trimming tumbler.

BACKGROUND OF THE INVENTION

Certain plants including but not limited to Cassava and *Cannabis* require post-harvesting processing such as Trimming, Drying, and De-Budding as part of their preparation steps. After harvest, these plants are generally trimmed of their leaf matters, leaving behind only the buds. Trim refers to the leftover leaves, which can be used for making concentrates and infused products. In other words, after harvesting the product, the plant is generally unusable unless some trimming functions takes place to "trim" certain parts and extract the usable part of the plant and this makes trimming process necessary and unavoidable. The solutions currently available consist of mostly through manual methods including but not limited to hand-scissoring by labor, mechanical scissors and motorized blades and such methods deem to be considerably outdated.

BRIEF SUMMARY OF THE INVENTION

Embodiments of the present invention pertain to a method and device for a robotic automated plant processing machine that provides enhanced capabilities as a result of integrating robotic features, automations, artificial intelligence, queuing, fault control, automatic transport, scalability, safety measures, smaller footprint, and other computerized functions, along with a creative business model. In design of this invention the following high-level requirements were achieved: scalable for small, medium, and large businesses; safer than other machines in the market; sanitation consideration; simplicity in maintenance, and automated functions to reduce the need for labor (e.g., integration of robotics, AI, and/or other computerized systems).

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Figure 1:
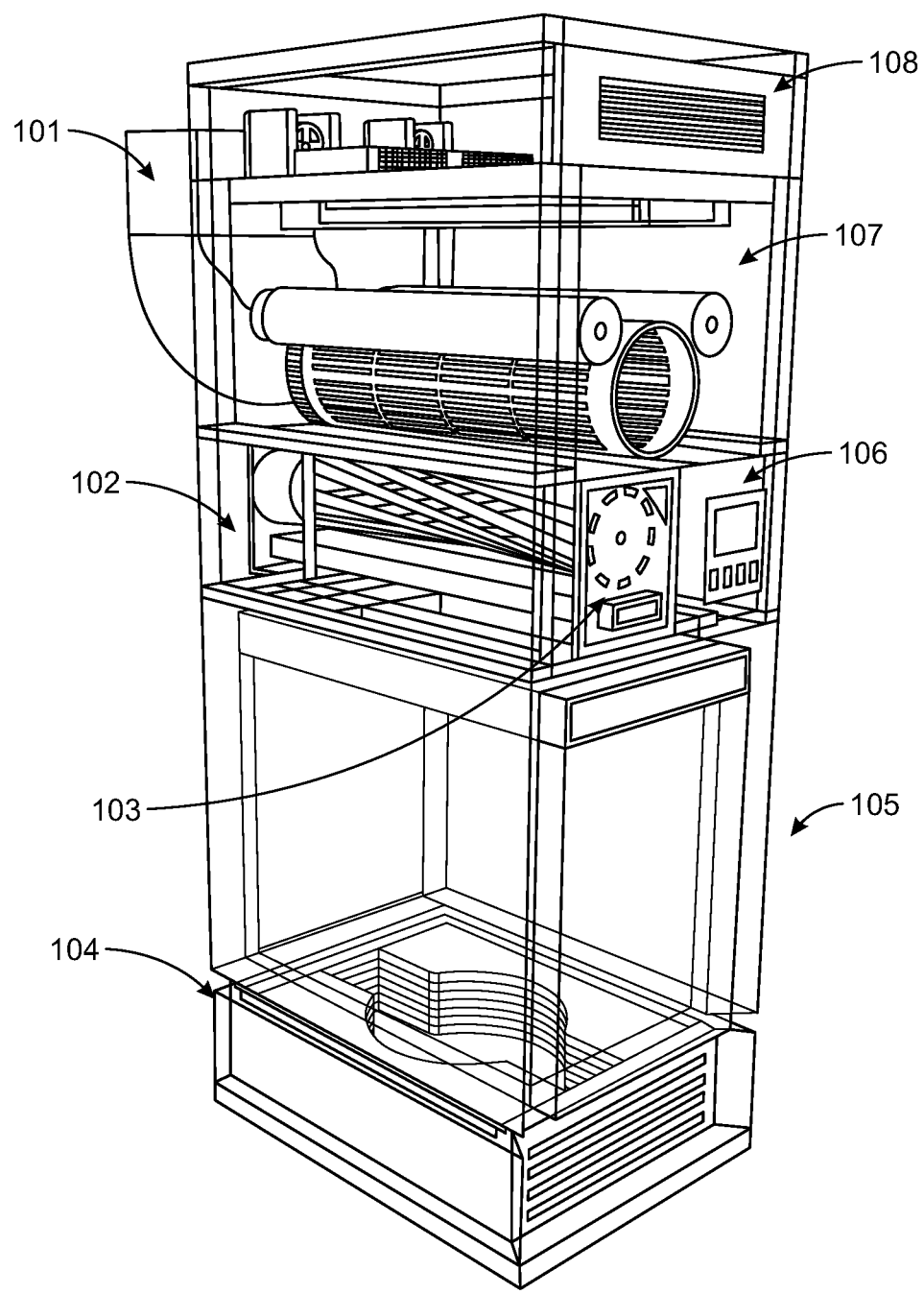
FIG. 1 shows an overview of one embodiment of the present invention.

FIG. 1 shows an overview of one embodiment of the present invention. In this invention, contrary to the conventional trimming, the size of the cylinder is reduced. This reduction in volume of trimming cylinder, allows for a more delicate trimming. In addition, we are utilizing a multi-direct-driven trimming cylinder to create a similar aggregated volume rate that can simply be multiplied by attaching extra unit(s), but also produces higher quality output, less energy consumption, faster and safer. In particular, a Processing Tube 101 allows the product to enter the machine. The tube utilizes the gravity, vacuum air suction, and magnetic capability to accomplish this function. Blade Assembly Unit 102 includes direct-drive engine, blade rotor, razor, latches, and related cartridges. A Removable Blade Unit 103 can be removed/inserted by utilizing the latch. A Vacuum Assembly 104 including the Engine and Air Filter and Air Flow creates Air Suction/Vacuum throughout the Unit. A Disposal Bin Assembly 105 includes a disposal Bin, removable handle and an air filter. The Control Panel 106 of the system displays fault, status, and allows user to control the speed and other functions of the machine. Element 107 shows a Removable Tumbler Assembly Section. The machine's Processing Assembly Unit is shown as element 108.

Figure 2:
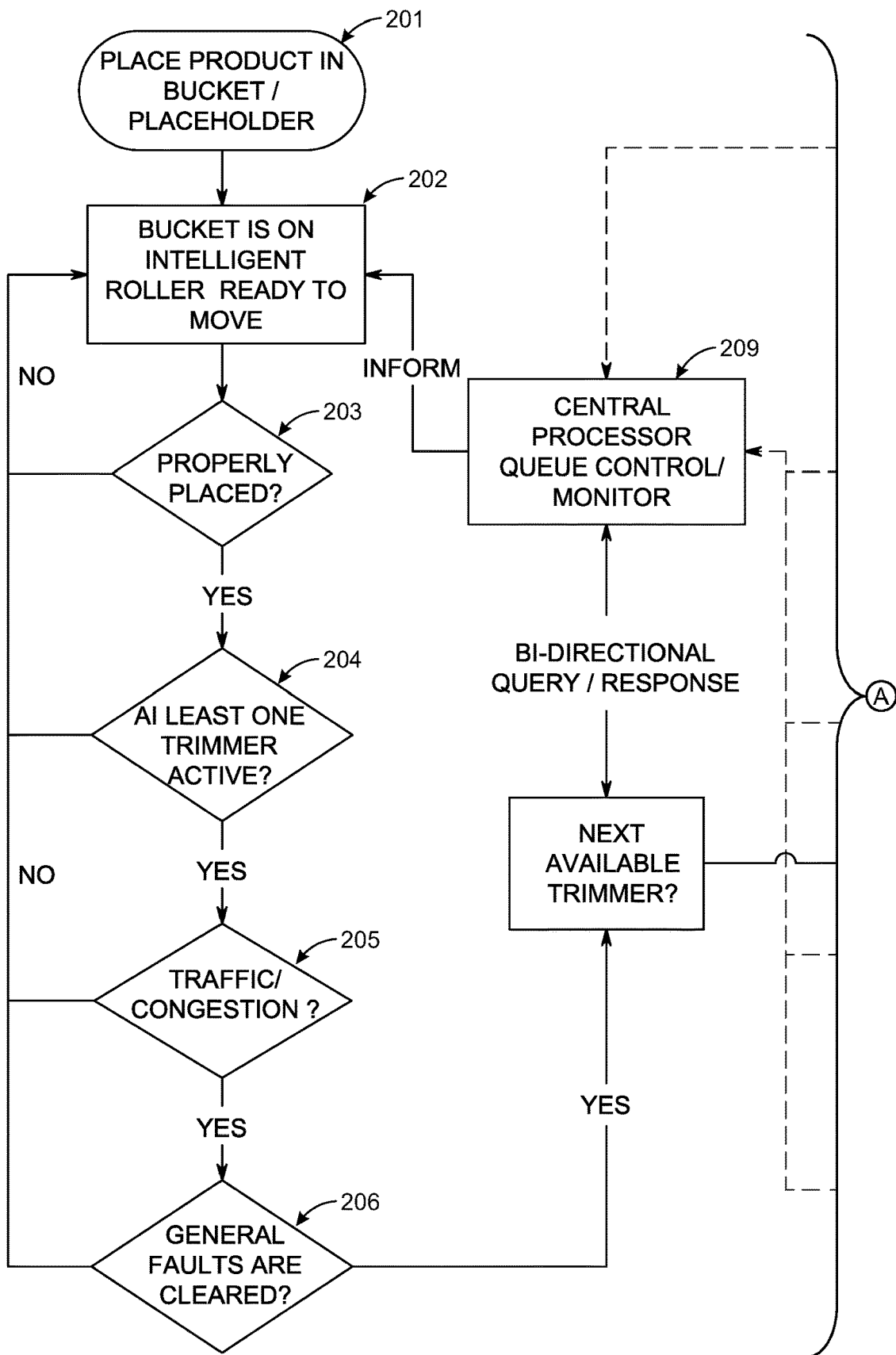
FIG. 2 shows a flowchart of the Queuing and Basic Process Flow.
Figure 2:
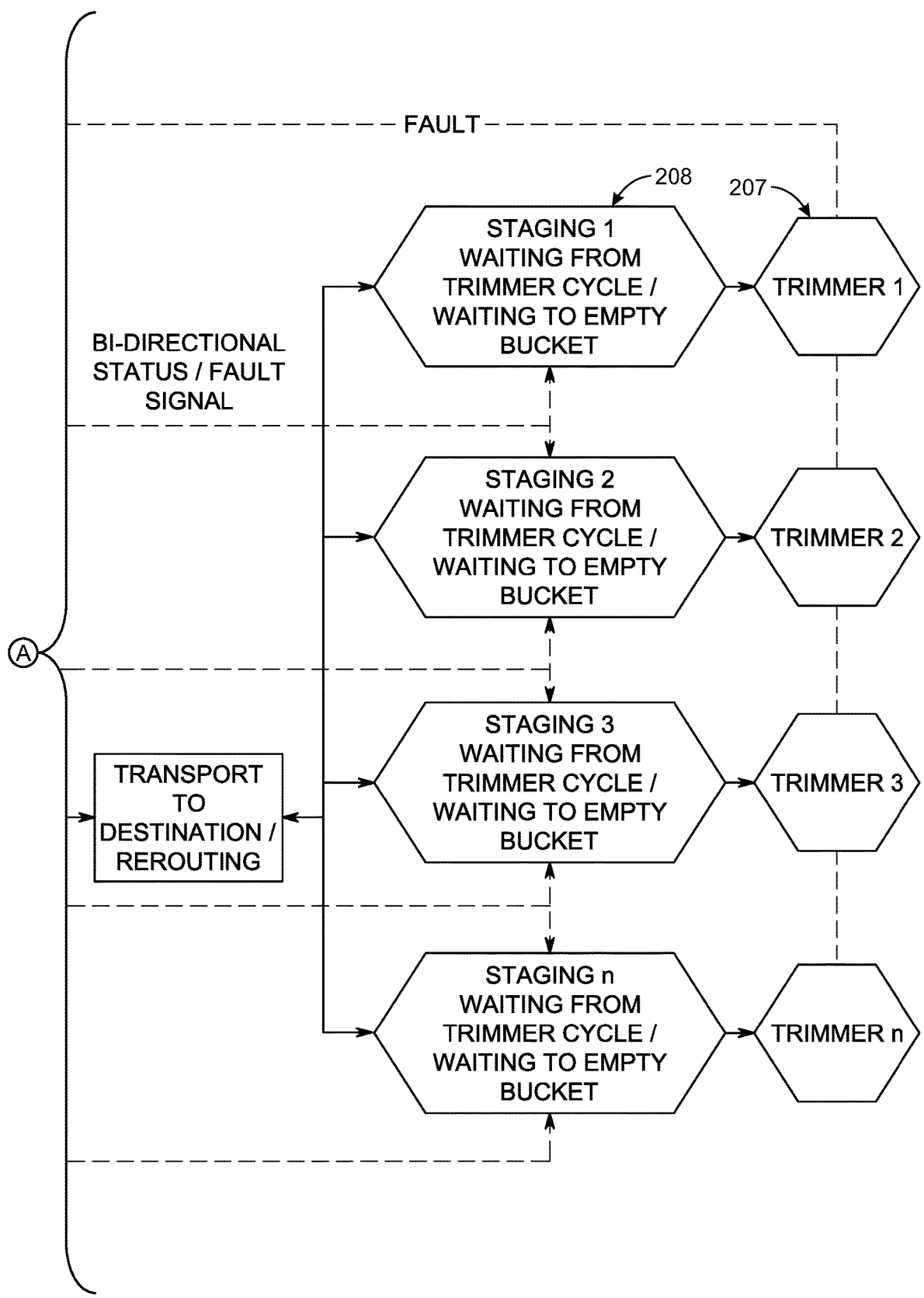

FIG. 2 shows a flowchart of the Queuing and Basic Process Flow. The conventional trimming methods including manual-scissor do not have a central processing unit and they work mainly "mechanical." In this invention, the trimming machine is managed by a central system (chipset/PCBA) that serves certain important functions including but not limited to: control the flow to the available trimming tumblers; instruct and manage the intelligent conveyor to deliver the bucket to such available tumblers; monitor the health of the system and in case of jam or overflow or a fault, the system stop the particular processing section while is still managing the remaining sections; recognize attachment or detachment of additional unit and expansion of the queue; ensure the parts are inserted properly, track the time equipment is used, and give feedback on the status of the machine; and measure the usage of the unit. In particular, the product is placed in a bucket 201. The bucket is on an intelligent roller, ready to move 202. It is ensured that the product is properly placed 203, at least one trimmer is active 204, there is no traffic congestion 205, and any general faults are cleared 206. One or more trimmers 207 and staging units 208 are controlled by the central processor/queue control/monitor 209. It should be noted that the decision steps are not sequential. They can happen simultaneously. The dotted line represents signal to central processor. The "n" represents any number since the system is capable to scale.

Figure 3:
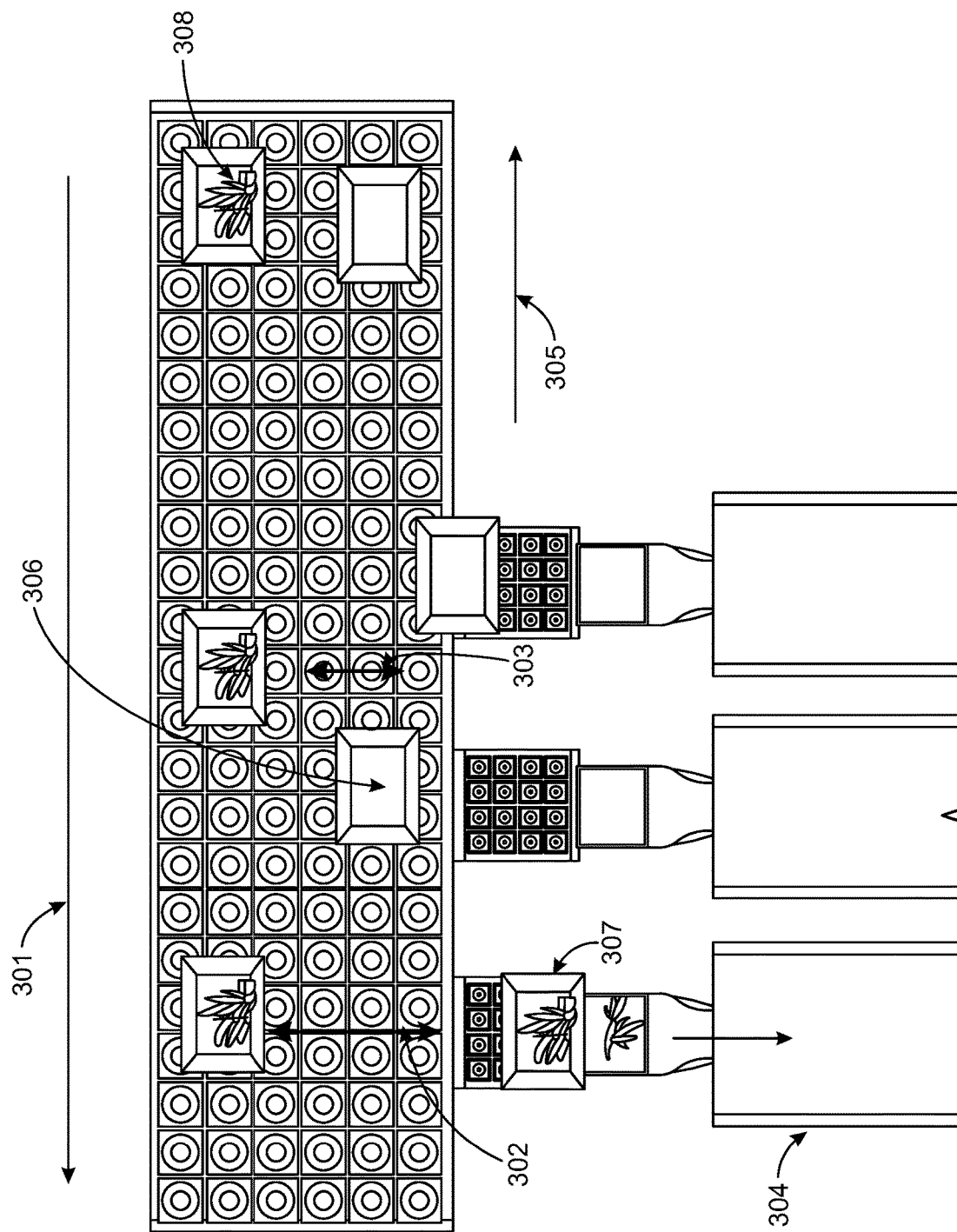
FIG. 3 shows a queuing and process flow example in action. It shows the general flow of the buckets/Product placeholders into the available processing station after they are filled.

FIG. 3 shows a queuing and process flow example in action. It shows the general flow of the buckets/Product placeholders into the available processing station after they are filled. In 301, the available processing station is determined by the system, and the bucket is routed to that station. The bucket is in the "staging" area and is in process of being emptied to the "Processing Tube." In 302, the filled bucket can be transported to any of the available stations and is currently waiting for the middle staging area to become available and then it gets transported there. Step 303 shows the product that has entered into the Processing Machine's tube and its tumbler. Step 304 shows the general flow of the bucket/product placeholders after its emptied. Step 305 shows an empty bucket, indicating the product was emptied into the Processing Tube and the bucket is enroute back to origin. Step 306 shows a Bucket/Product Placeholder that is in process of being emptied. The product moves easily into the Processing Tube as the bucket is close to the opening of the Tube since A) the bucket is stopped B) The bucket and Processing Tube has a magnetic function to pull the Bucket Door and C) the air suction generated from the machine's Vacuum sucks the product into the tumbler.

Figure 4:
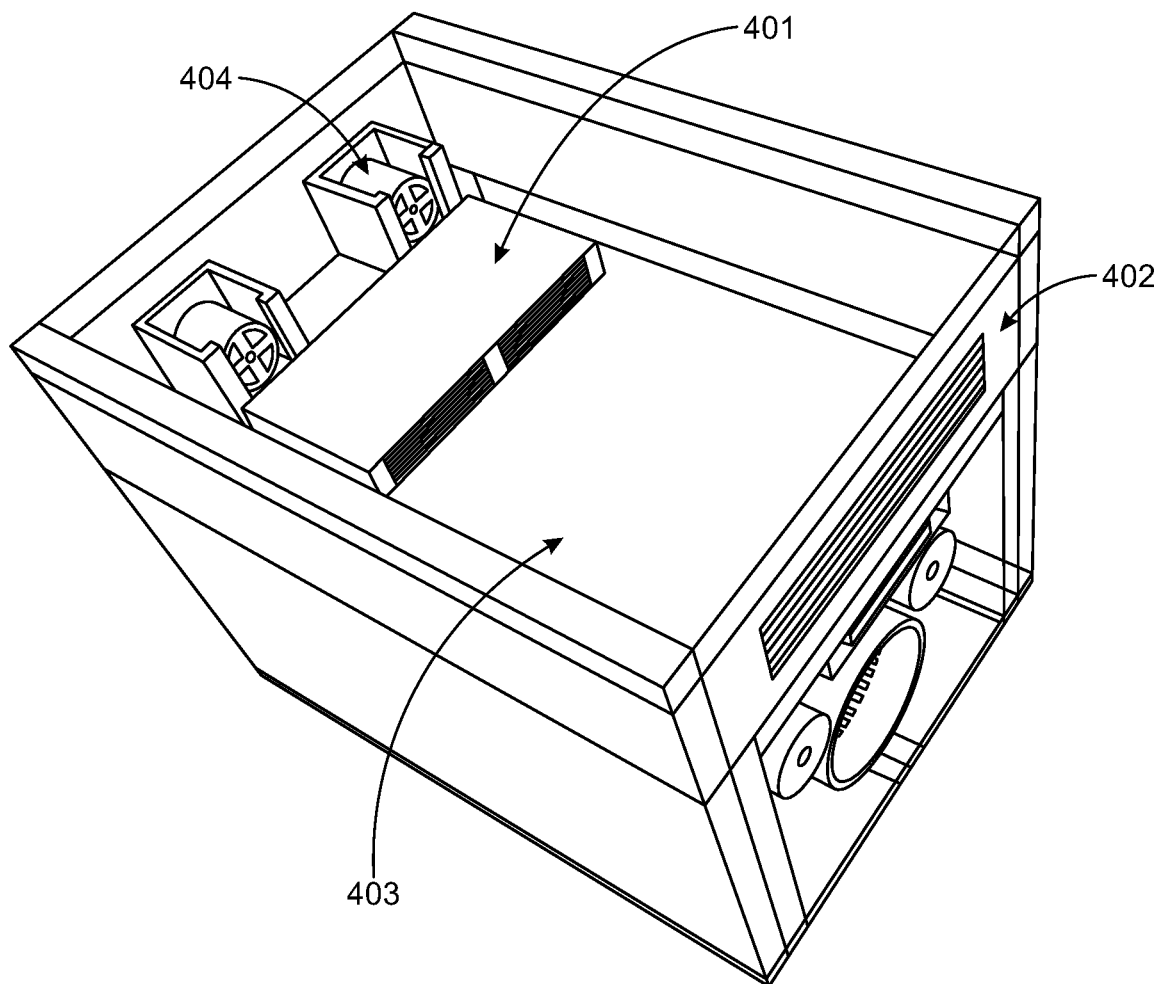
FIG. 4 shows an exemplary processing unit and corresponding signal/sensor controller.

FIG. 4 shows an exemplary processing unit and corresponding signal/sensor controller. The system includes many sensors to identify various behaviors that would happen in the operation. Such behaviors include but not limited to: if the Disposal bin get filled; if any fault in the system is identified such as a part is not inserted properly, the system identifies a jam/overflow; if an unidentifiable object in the tumbler is discovered such as a rock; and/or if additional units plugged in or unplugged.

A description of triggering event of the sensor is as follows. The disposal bin has a simple sensor that triggers when it identifies any object across the light. The fault system is triggered when someone attempts to unplug any of the parts or accessories using a latch sensor. The unidentified object sensor is triggered if any out of balance turn in the tumbler or metal object is identified using magnet sensor. These sensors would signal the main chipset system on each unit that there is a fault or change in the system and the chipset then can control the flow of the system or inform the user via screen/light to correct the error or provide status of the operation. The errors are communicated to the user via function of light, screen, or application.

The Processing Unit is in charge of maintaining the queue and fault signals. The processing unit board 401 can be placed in other areas of the system depending on customer requirement. The airflow unit 402 is required to keep the equipment cool. The separator unit 403 is located between the board and trimming functionality of the machine. And the fan 404 keeps the equipment temperature within the required range.

Figure 5:
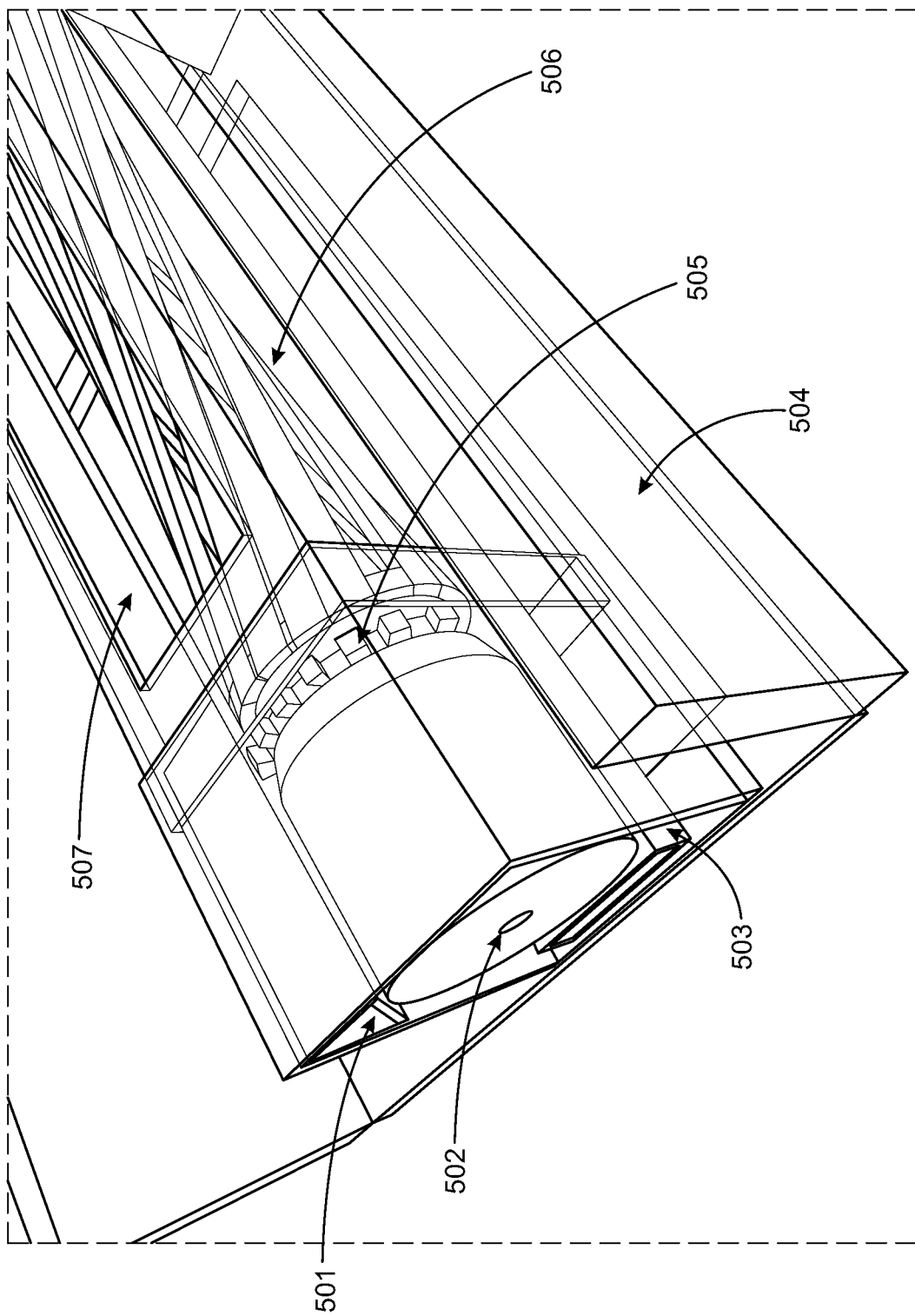
FIG. 5 shows a side sectional view of an exemplary blade assembly. In the conventional trimming machines, the engine (motor) operates and connects to the trimming blade using a belt.

FIG. 5 shows a side sectional view of an exemplary blade assembly. In the conventional trimming machines, the engine (motor) operates and connects to the trimming blade using a belt. Therefore, it requires a consumable belt to transmit motion from one shaft to the other shaft. The motor turns the blade using the belt. Belts have always been known to be a bottleneck because of the endurance, increased vibrations, and reduction in the transmitted energy. Using the existing systems in the market and utilizing the belt causes major loss of transmission power because of usage of belt.

In the solutions currently in the market, the main angina is connected to the blade by a "belt" very similar to what is used in the hand right vacuum machine. In our analysis, having a belt attached to the blade, increases the turbulence of the overall machine and thus by having it directly attached to the blade we were able to reduce the overall turbulence and noise of the trimming machine.

In one embodiment of the present invention, each blade can be run by a directly-attached motor, also known as "direct-drive" or "mini-direct-drive" the motion is transferred directly to the target. Eliminating the belt also allows the machine to operate outside of the normal range of temperature that's suggested for the belt and reduces or eliminates the transmission loss. Using direct-drive one can utilize more transmission power with the less energy, in fact almost a double amount of performance and maintenance of such belt is eliminated since the dust cannot get into the belt of the main blade. Replacing the motor would consist of a simple unplugging and re-plugging the motor. It would also allow the blade to be hot-pluggable. The units operate with "direct-drive" engine eliminating the need for primary belt.

The razor cartridge 501 allows the user-insertable blade and razor be properly plugged in. A direct-drive motor/engine 502 (contrary to belt-driven motor) and the blade are shown coupled to the cartridge 501. A latch 503 enables simple unplug/replug/reinsert of the blade cartridge. The frame of the blade assembly 504 allows the trimmed particles of the processed product to flow through the disposal bin. A gear 505 is utilized for the direct-drive motor. The gear 505 can be coupled magnetically for easy insertion and removal of the unit. The blade rotor and cylinder 506 is coupled to gear 505. The razor unit 507 is combined with the blade which enables trimming the product.

Figure 6:
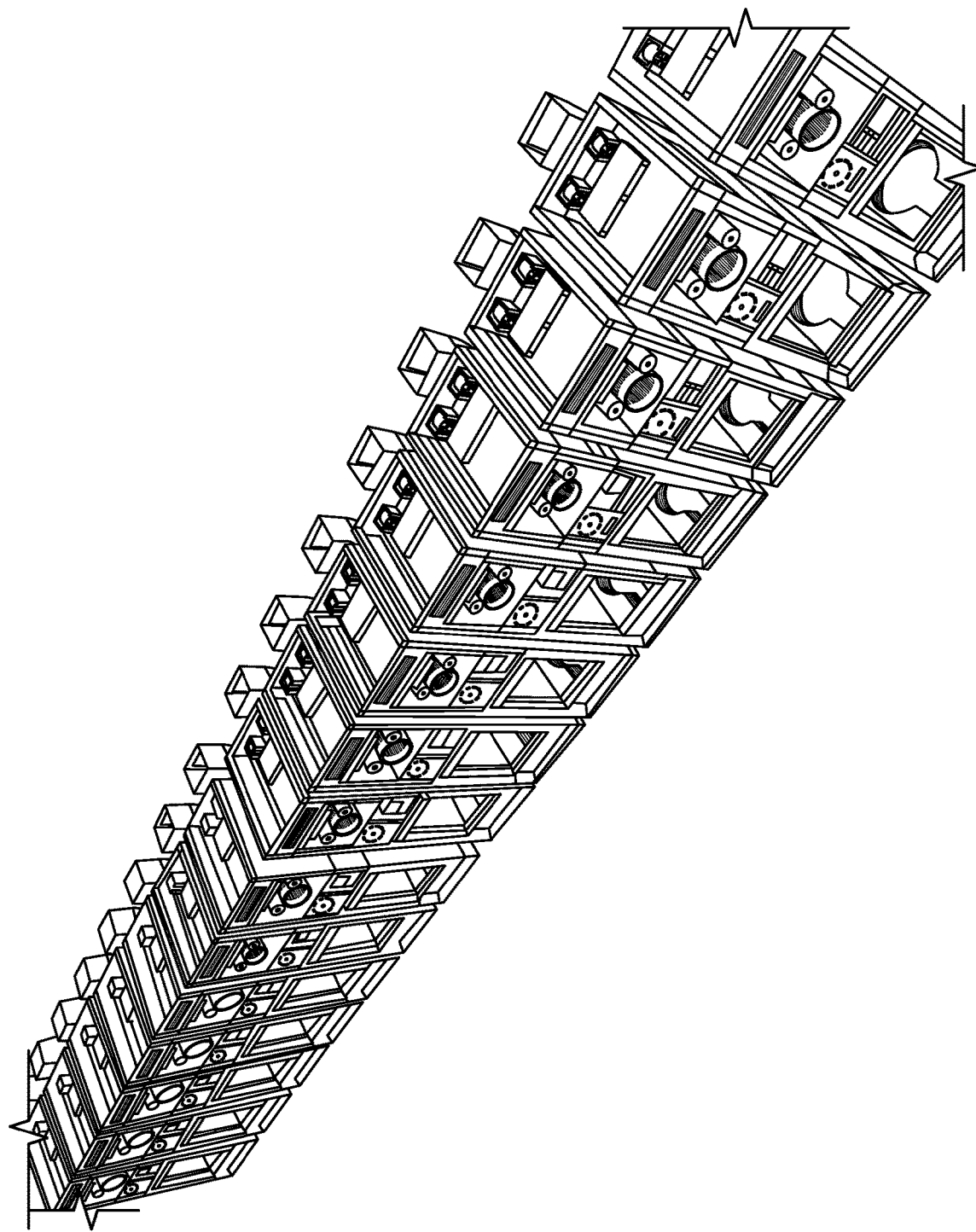
FIG. 6 shows an example view of how this invention's multiple parallel systems of this method and device can interconnect to provide the necessary scalability to the user.

FIG. 6 shows an example view of how this invention's multiple parallel systems of this method and device can interconnect to provide the necessary scalability to the user. Since the industry in *cannabis* and related fields is growing rapidly, the factories and production facilities are facing a huge problem of scaling to the demand. This means the machines and trimming devices that is being used need to be scalable to adapt to the growth in the industry. Conventional trimming machines are not able to increase in capacity and require an entirely separate production line to be created in parallel to what already exists. This requires significantly more footprint and cost and multiplies the cost proportionally. For example, the only way to increase the number of trimming machines in conventional trimming is to add a new production line that means double the labor and the vacuum and all the other parts and accessories that are involved.

In one embodiment, the machines are scalable to virtually any number because of utilizing a queue function that is managed by the chipset. Each machine can perform individually but if connected to another machine it will add to the overall queue. The unit is pluggable to additional exactly same unit. The chipset would control the operation of additional outlets for the trimming purposes. The purpose of this scalable functionality is to allow additional throughput and match the user's need in terms of scaling up or down. For example, the machine that has 3 input holes and each machine is maintaining the queue at number 3. Once the second machine is attached to the first machine; the system would then update queue to match the total number of inputs available (3+3=6) and so on.

The machine keeps track of total number of available inputs. Regardless of number of machines attached, if any fault occurs, the system simply removes the particular input from the queue. In the above example, if a jam is detected in one of the inputs the system would trigger a signal of fault and reduces the available queue to 5 (6−1=5). As explained below the conveyor ARB in our method and device is scalable in the same way. The connection between each system is done through magnetic connector and/or cable(s).

Figure 7:
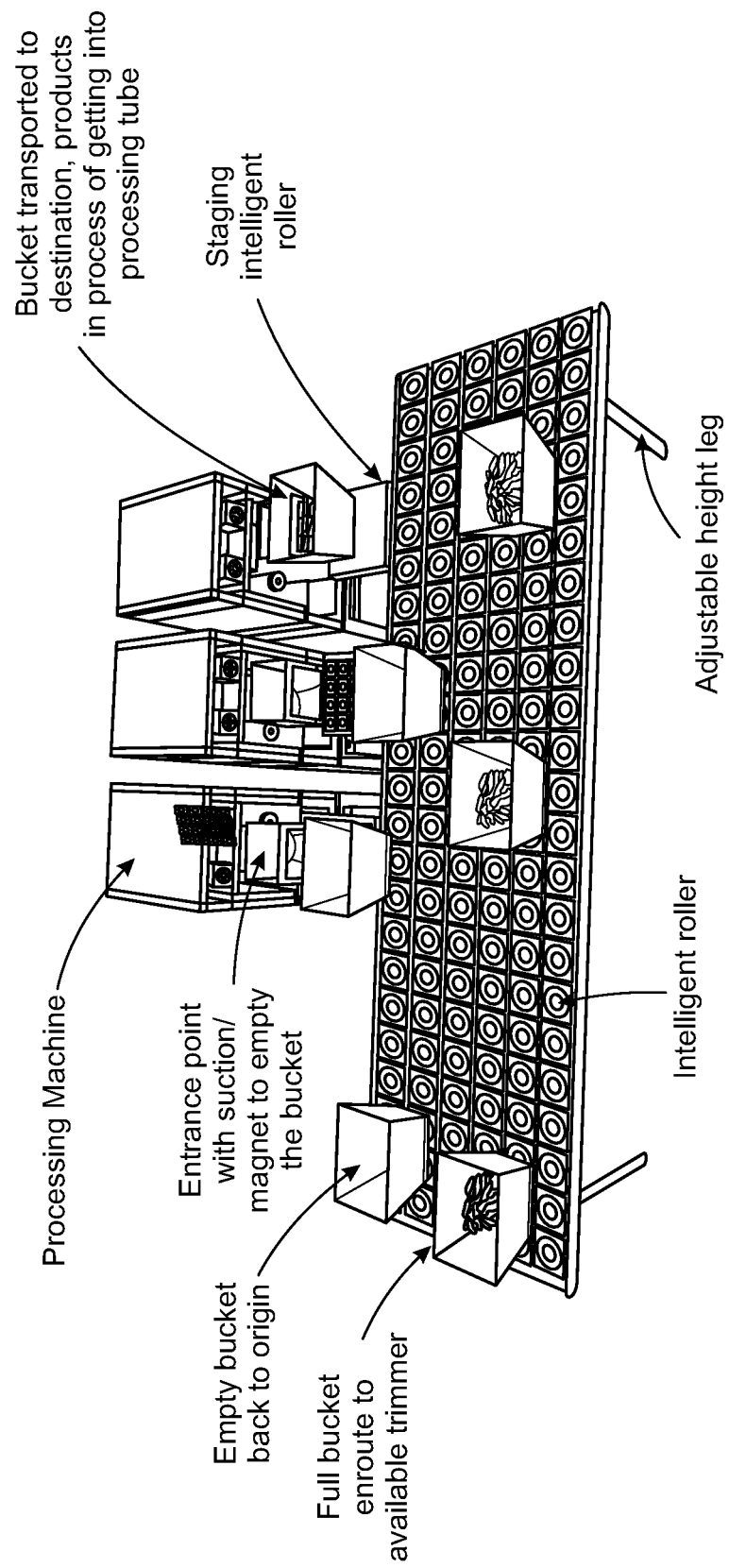
FIG. 7 shows an intelligent roller/conveyor that is expandable with additional sequential units according to one embodiment of the present invention.

FIG. 7 shows an intelligent roller/conveyor that is expandable with additional sequential units according to one embodiment of the present invention. In this invention, the conveyor is integrating a technology called Activated Roller Belt (ARB). Integrating ARB with trimming machine above would allow automatic management of dropping the product such as *Cannabis*/hemp into the proper container. The conveyor is configured to deliver a bucket to one of the available disposition areas. The ARB Conveyor that is attached to the machine and is designed exclusively for this machine to operate in an automatic manner. First, instead of the product be placed on the conveyor directly, we are utilizing "smart" buckets that the product would be place on these buckets. Having a bucket eliminates the need of sanitization of the conveyor completely and producers can simply wash or sanitize the individual buckets at their convenience without causing any stop of production.

In order to accomplish a systematically-managed conveyor, and unlike the conventional system, the conveyor here has two lanes side-by-side. A first lane is used to transport the product (using the buckets as explained below) and the second (return lane) is used to transport the empty buckets back to the user so that they can be filled again. Each entrance on the trimming machine is further attached to a "staging" roll that is fed by the conveyor and after the bucket is emptied it will stay in that staging area until it has a space to join the return lane. By utilizing staging rolls, the conveyor and the trimming machines are scalable to virtually unlimited number because the incoming and outgoing traffic will not be affecting throughput of the production.

Figure 8:
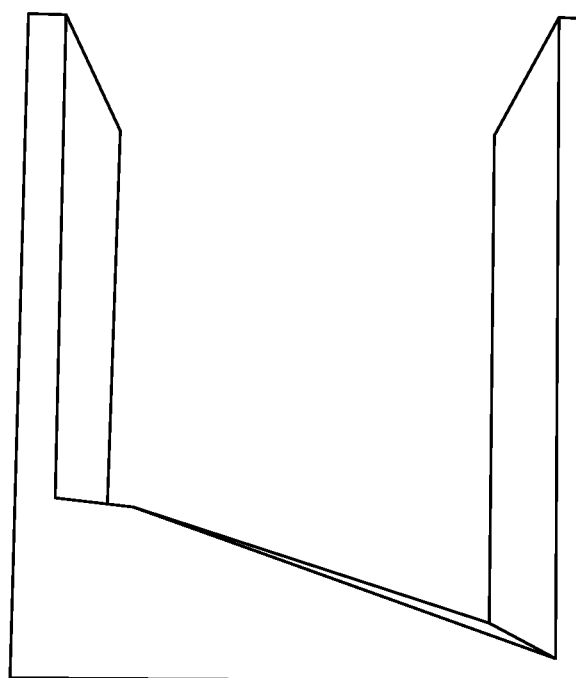
FIG. 8 shows an exemplary bucket whereby the bucket slope enables product in the bucket to move out faster.

FIG. 8 shows an exemplary bucket whereby the bucket slope enables product in the bucket to move out faster. Instead of having the product travel directly on the conveyor, one embodiment of the present invention utilizes an intermediary placeholder that's mobile (called buckets) that would transport on the ARB conveyor. Using this placeholder (called buckets) provides the advantage of the product not touching the conveyor belt directly. These buckets are designed to get as close to trimming entrance point as possible so that they are automatically emptied as they get close to the trimming machine. As result, there is no need for sanitization of the conveyor itself and the user would simply need to sanitize the buckets, which is a considerably easier task than sanitizing the conveyor. In this configuration, the product never touches the roller or conveyor as it is only moved through the buckets. The user can adjust the speed of the bucket movement in which would affect throughput of the bucket and the system overall. The system manages the traffic flow of the bucket using a "first lane" of the ARB conveyor depending on the availability of the trimming entrances and places the full buckets in the staging area roll. Once the bucket is emptied, the system would move the bucket back to the "return" lane so it can go back to the user and be refilled. This creative bucket on the conveyor is using is magnetically activated. This bucket would allow the contents of the bucket to be emptied the moment it is near the trimmer entrance area to the trimming machine. The bucket is also slightly slanted (sloped) so in the normal condition triggers the exit of the products contained in the bucket. The vacuum in the machine as explained below further enforces and reduces the time that the bucket is emptied after it's close to the trimming machine.

Figure 9:
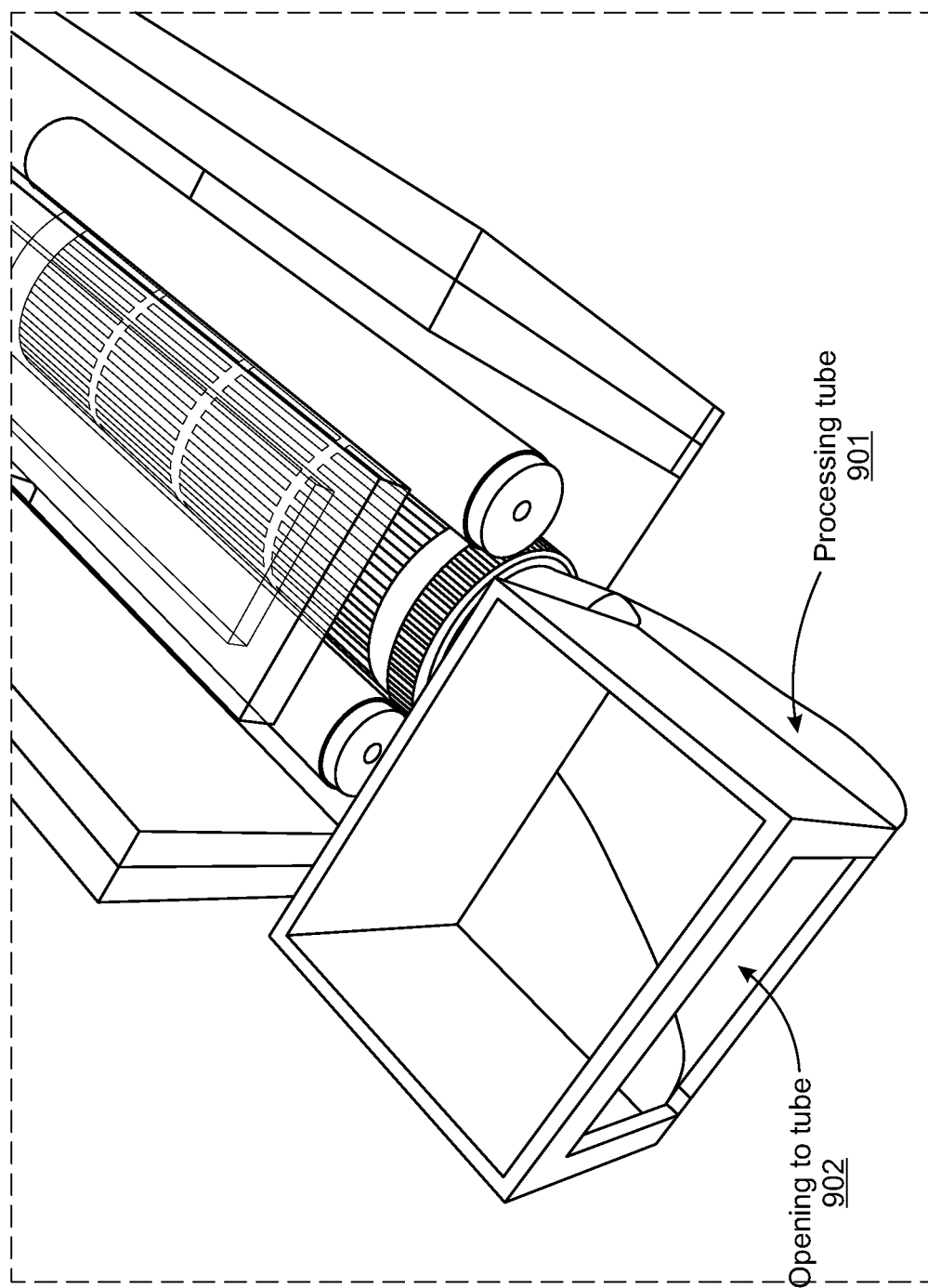
FIG. 9 shows a processing tube where the bucket contents are emptied and the contents are moved for processing into the machine from the opening to the tube.

FIG. 9 shows a processing tube 901 where the Bucket contents are emptied and the contents are moved for processing into the machine from the opening to the tube 902. Combining the chipset queuing function with the ARB rerouting capability, would allow the maximum flexibility and scalability since one can now transport the product only to the available queues and any unavailable or faulty inputs are marked as unavailable by the system until such fault is corrected. The conveyor is designed in a way that it would transport the buckets according to the queue. The queue is generated by the system's chipset and provides a signal to the conveyor in form of OPEN/CLOSE that indicates to the conveyor whether a corresponding entrance on the trimming machine is available or the bucket delivery. Once the entrance point is identified as "Deliverable" the conveyor then transports the bucket to one of the entrance points in combination of random and sequential manner. The bucket is then is on its way to the entrance point, and it will have a pause there for few seconds until the contents are emptied. Once the contents of the bucket are emptied, the system would place the bucket back into the return lane to go back to the filling area that user would place the buckets back into the system. This continues until the production is completed.

If one of the entrance points becomes unavailable, the system would communicate to the ARB conveyor system that such entrance point is unavailable via a closed/unavailable signal. The system would continue to show the point as unavailable until the fault is resolved at which point will change the signal to "available/open" and the conveyor would then re-continue to send the bucket to the entrance point. For example, let's assume that one out of the three entrance point becomes jammed and the system signals it as "unavailable/closed." As soon as signal is received by the ARB conveyor, the conveyor system would stop sending new buckets to that entrance area and would distribute the load to the other two available entrance areas until the fault is resolved.

In one embodiment of the present invention, each of the frequently replaceable parts utilize a simple plug-n-play method that a latch is pushed/pulled so the replaceable parts of the trimmer is taken out and put back in. A non-technical user can do so without causing safety concerns. At the minimum, the following parts are known to be plug-n-play:

1. Blade/Razor assembly
2. Tumbler Assembly
3. Brush Assembly
4. Disposal Bin Assembly As explained in the signal/sensor section above, as soon as the system senses that one of the components are being removed (triggered by the door sensor) the system would automatically stop the flow to that unit. The user can simply latch out and latch-in the particular parts without interrupting the other systems that are connected.

In one embodiment of the present invention, an integrated assembly contains both the blade and the razor in the same containment, which helps greatly with the eliminating or reducing the need for manual adjustment. First of all, the blade and razor are combined together in a form of assembly and not generally separable by the user, very similar to printer drum. Once they are entered in to the system, the safety cover opens and the razor and blade is uncovered inside the system. Because they are built to be in form, generally minimum adjustment is required as the replacement or maintenance requires the entire assembly to be replaced. Because the user doesn't directly work on the blade, the system is much safer. The additional cost of the housing on the blade/knife set assembly is easily offset by the reduction in the labor cost that's needed in the existing machines with manual work and can utilize both blade/razor and a water jet cutting system.

Figure 10:
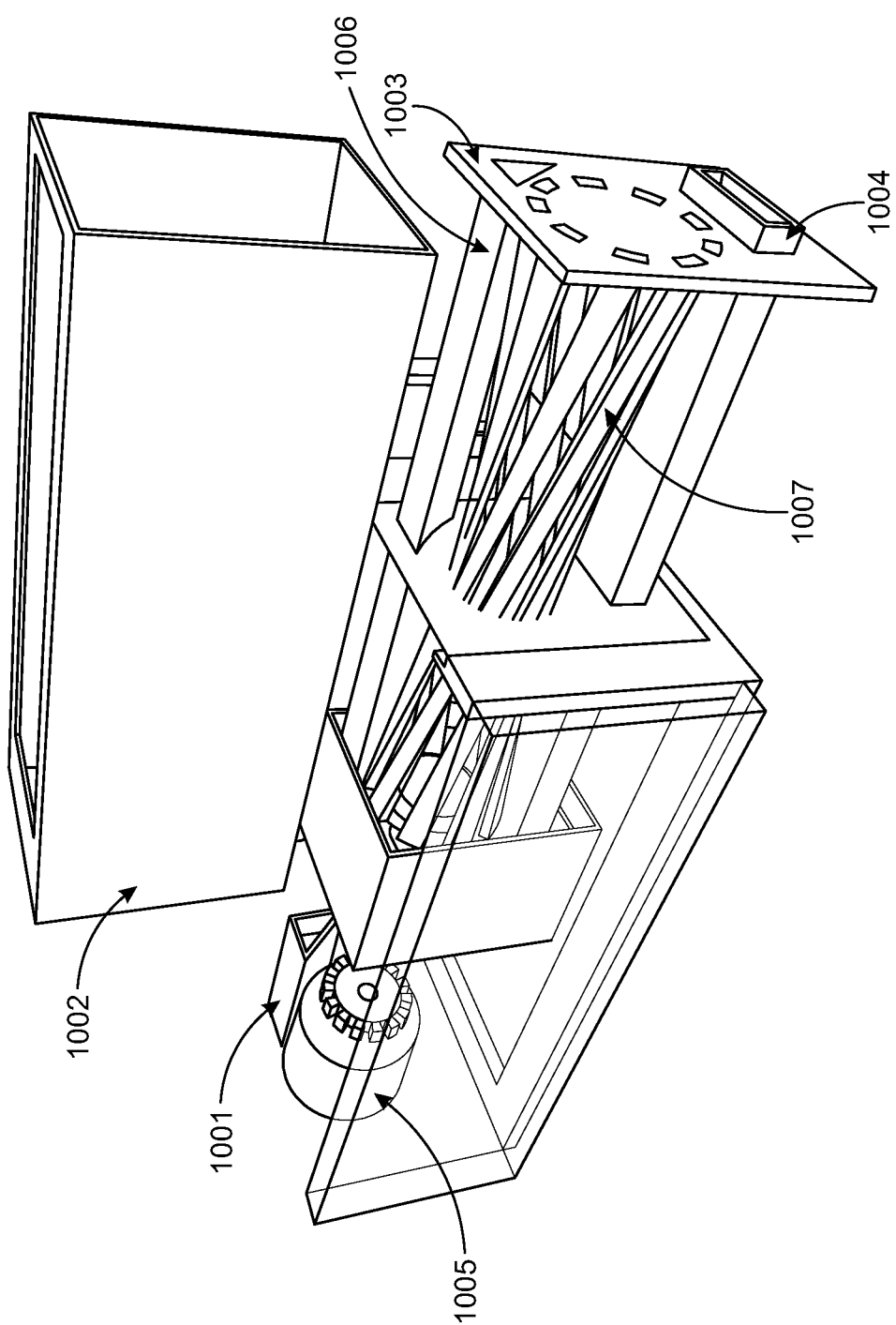
FIG. 10 shows a blade assembly side view according to one embodiment of the present invention.

FIG. 10 shows a blade assembly side view according to one embodiment of the present invention. A razor cartridge housing 1001 is used to hold the razor upon insertion of the blade cartridge. The Blade Cartridge Frame 1002 holds the blade components. A front plate 1003 of the Blade Assembly and Cartridge is shown. Latch 1004 is used to "unhook" the cartridge and therefore user can remove/reinsert the blade cartridge. A direct-drive motor 1005 is used, whereby the belt-driven motor is eliminated and therefore transmission of power increases significantly along with reduction of turbulence and energy consumption. A razor 1006 is used in combination with the blade to "trim" the product. Once the product is trimmed the trimmed particles pass through the bottom section of the blade assembly and into the disposal bin via the air suction of vacuum engine. The remaining product (that is now trimmed) passes through the tumbler. The blade (cylinder typed shape 1007) creates the cutting capability by turning rapidly.

Figure 11:
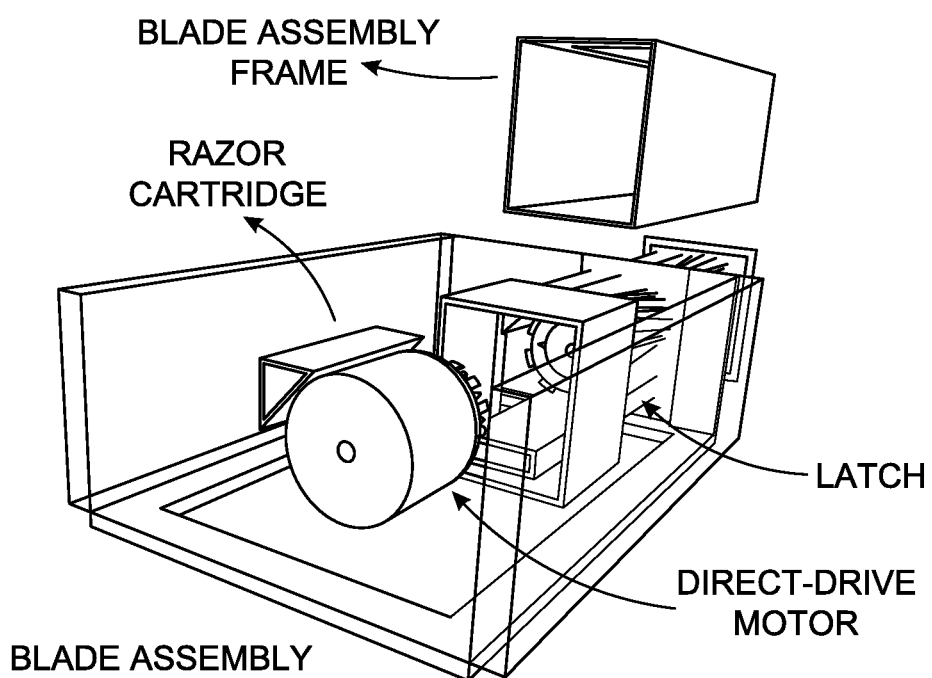
FIG. 11 shows the back view of the blade assembly.

FIG. 11 shows the back view of the blade assembly. In one embodiment of the present invention, instead of general air-suction method, it uses vacuum technology; and it's housed inside the machine itself. The vacuum is directly connected under the blade and is separate for each unit. The built-in vacuum eliminates the need for a separate long hose since it's directly connected under the blade and as the leaf products are trimmed, the cut particles (generally disposed or further extracted) are stored in a vacuumed section that is easily replaceable and easy to empty, very similar to replacing and emptying bagged or bagless vacuum machines. This is accomplished by sealing the disposed bin to create the vacuum within the system, instead of "external" to the system. As explained above, the sensors would help to identify if the disposal bin (e.g., disposal bin) is close to be filled and in case of such signal the system would stop sending traffic or product to that trimming entrance.

Figure 12:
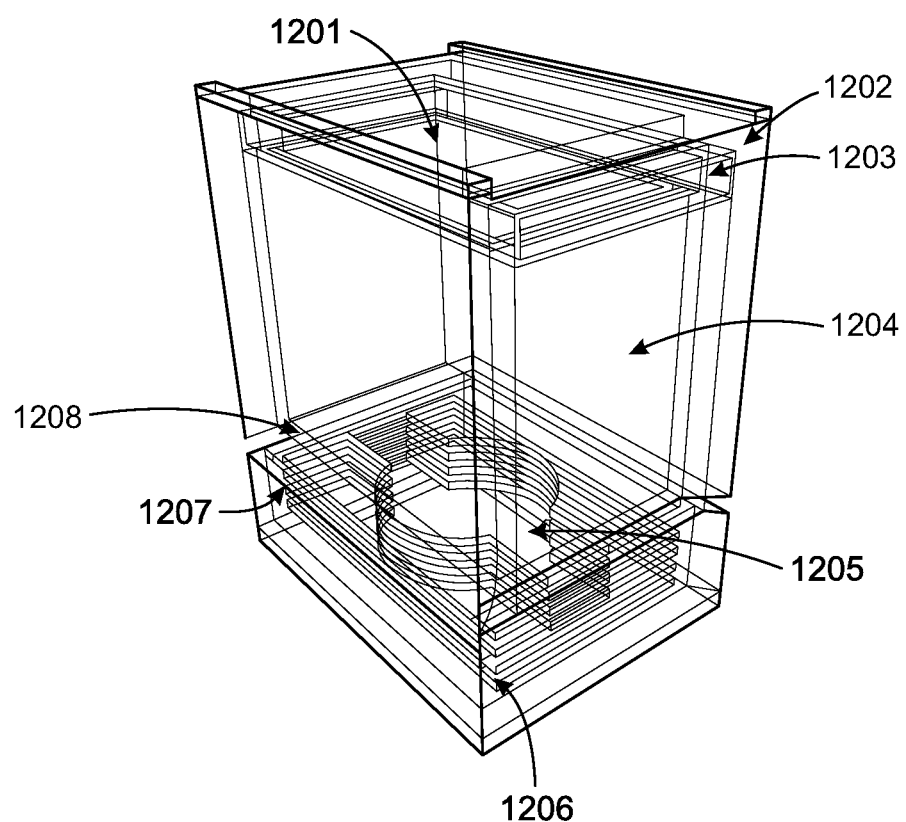
FIG. 12 shows a top view of the disposal bin assembly according to one embodiment of the present invention.

FIG. 12 shows a top view of the disposal bin assembly according to one embodiment of the present invention. An opening section 1201 of the disposal bin is shown. Air suction from the vacuum engine creates suction through the disposal bin assembly, blade/razor assembly, tumbler assembly, and processing tube. A disposal bin frame and sensor 1202 surrounds the opening section 1201. A Handle (Latch) 1203 is used to remove/insert the disposal bin. The disposal bin 1204 would hold the "trimmed" particles. The vacuum engine 1205 creates the vacuum which produces the vacuum air flows through 1206 and 1207. A vacuum air filter 1208 separates the disposal bin 1204 and vacuum engine 1205.

Figure 13:
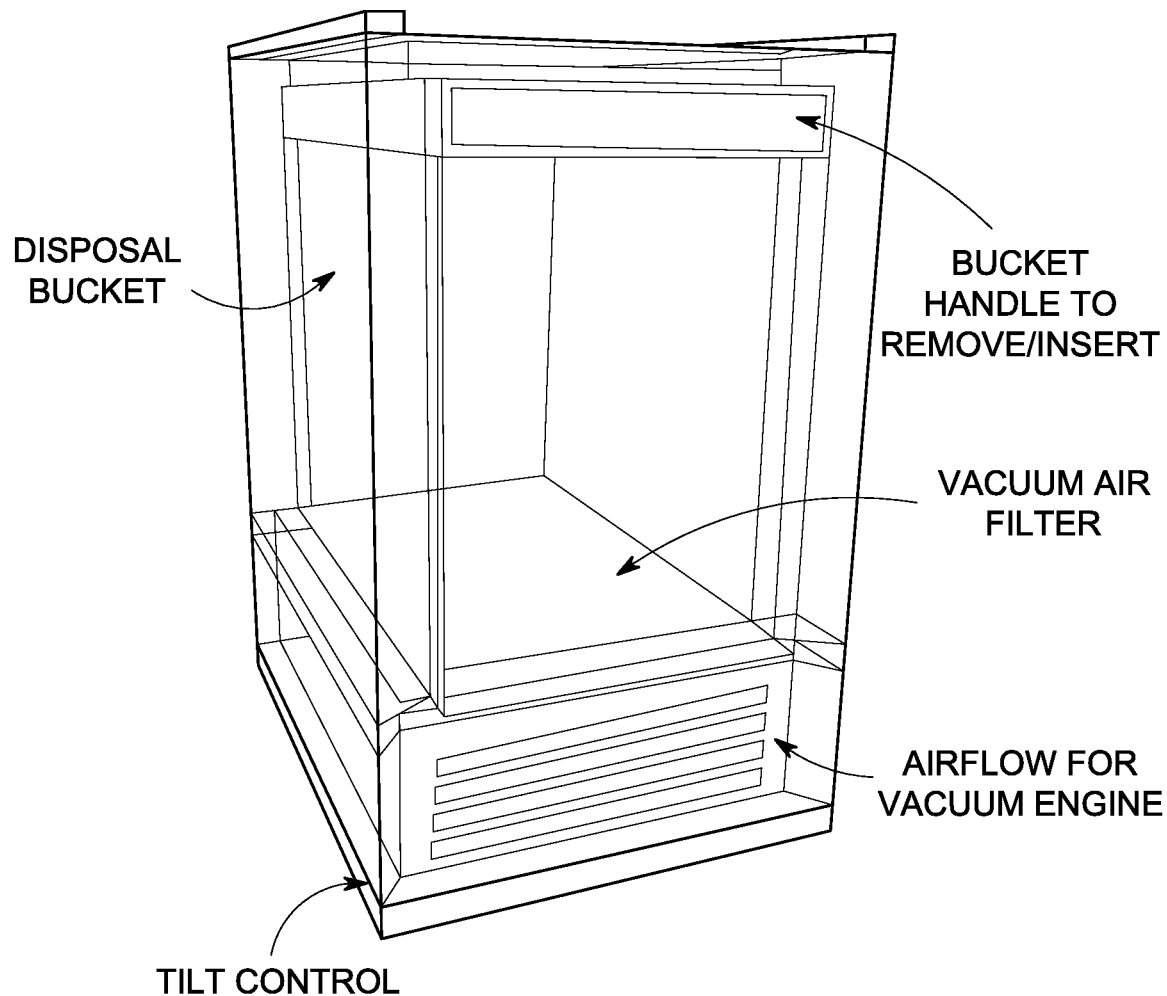
FIG. 13 shows a side view of disposal bin assembly according to one embodiment of the present invention.

FIG. 13 shows a side view of disposal bin assembly according to one embodiment of the present invention. As explained earlier, the conventional trimmer has grown in size dramatically over time. The current trimmers in the market are 5.5 inches in diameter and they are available currently all the way to 13.5 inches. Larger diameter certainly means larger volume that the tumbler can handle but it also means the larger weight that is circulating in the tumbler and as result would crush and deform the product (*Cannabis* product) and leaves that were supposed to be trimmed at the first place would be deformed.

The more volume in the tumbler causing adverse effect on the final product. Therefore, in one embodiment of the present invention, the size of tumbler is reduced so less volume can fit on each individual tumbler and instead adding additional tumbler in each unit so that the overall throughput stays the same but with much higher quality of final product. This would further reduce the labor cost of quality check and the need to redo the trimming.

Figure 14:
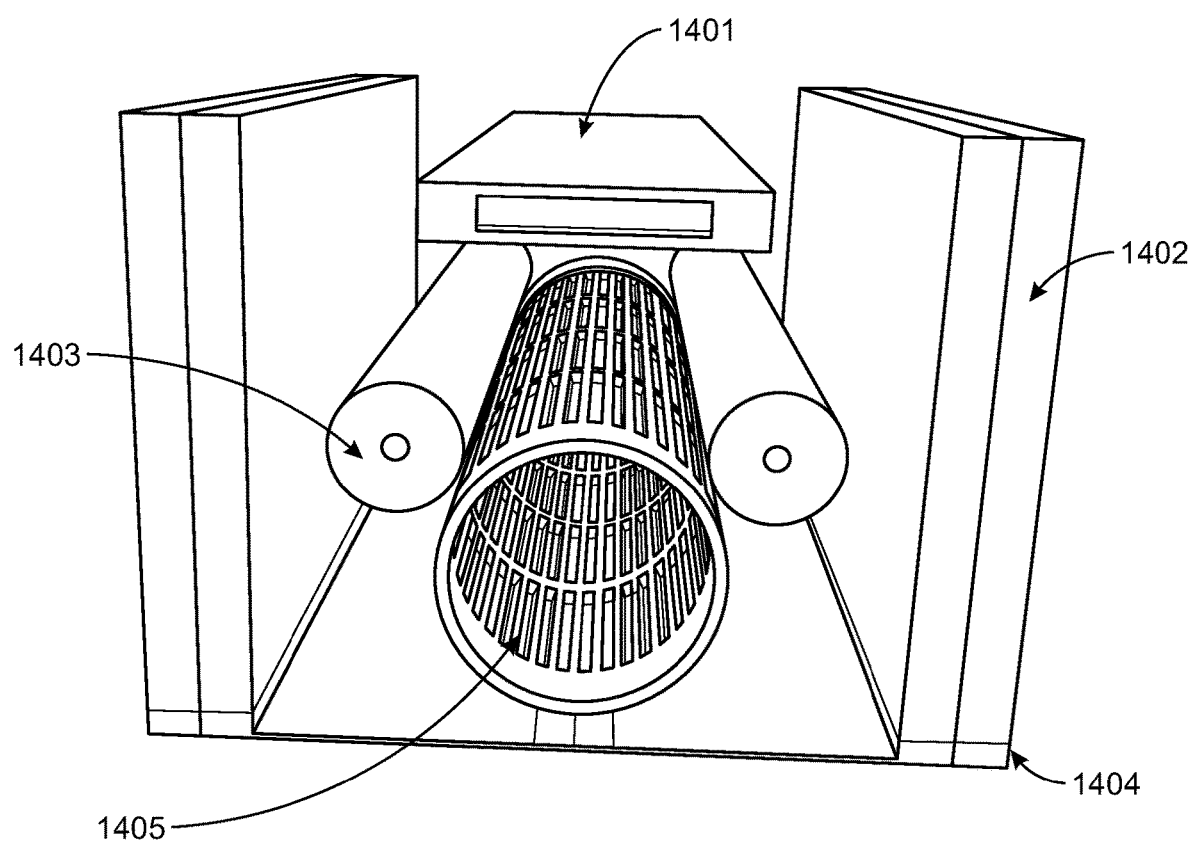
FIG. 14 shows a tumbler assembly according to one embodiment of the present invention.

FIG. 14 shows a tumbler assembly according to one embodiment of the present invention. A latch/handle 1401 is used to remove/reinsert the tumbler cartridge and create the full assembly. A tumbler frame 1402 houses the tumbler assembly. Brush 1403 takes over the trimmed particles residue from the tumbler. An opening 1404 provides access to the blade. The tumbler exit point 1405 is where the "trimmed" product exits the machine. The user can have the "trimmed" product deposited into a bin, or a different roller or bag at their choice.

Figure 15:
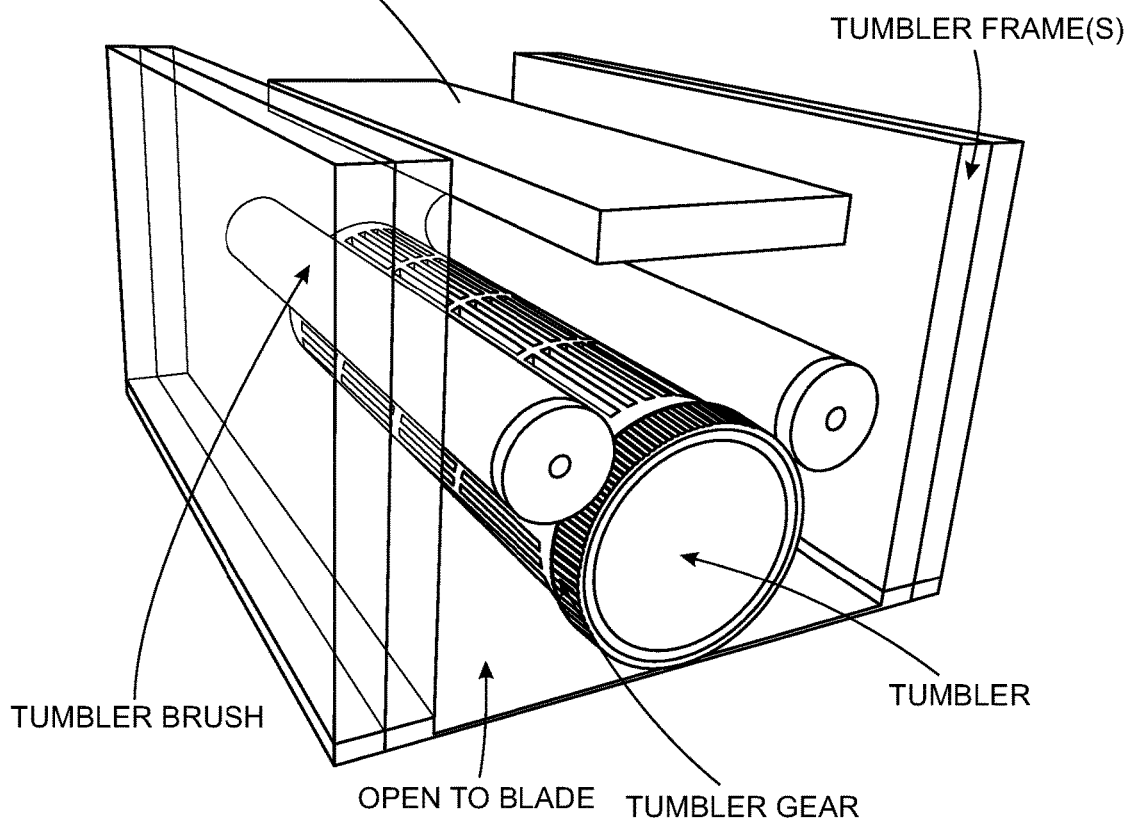
FIG. 15 shows the back view of a tumbler assembly according to one embodiment of the present invention.

FIG. 15 shows the back view of a tumbler assembly according to one embodiment of the present invention. The tumbler frames, tumbler, tumbler gear, opening to blade, tumbler brush, and latch to remove/insert the tumbler cartridge assembly are shown for the tumbler assembly.

Figure 16:
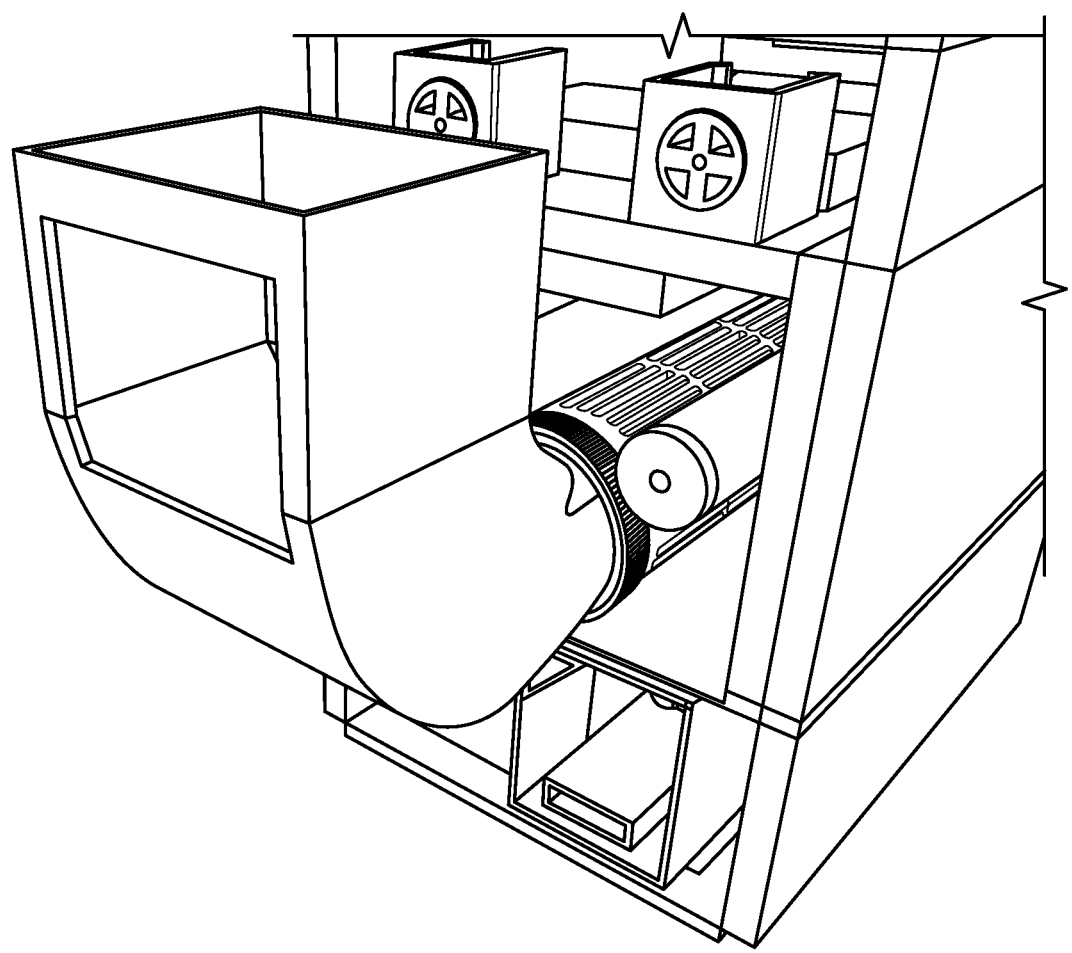
FIG. 16 shows a tilt mechanism for tilting the tumbler assembly.

FIG. 16 shows a tilt mechanism for tilting the tumbler assembly. It has been discovered that the optimal operation is highly dependent on the function of the tilt because various products require different speed throughout the trimming machine. Higher tilt means that the product would move faster in the trimming machine. To simplify the adjustment of the tilt, the machine automates the adjustment so that by tuning the knob, the system would increase the tilt of the machine. The tilt of the entire system is adjustable via manual or automatic method. The general range of the tilt is between 1 degree and 7 degree but can be further adjusted.

Thus, by utilizing the same process flow, and queue function, this method and device can apply to De-budding, and Drying function. This method can be used in any plants cultivation and related processes as well as long as the shape and look of the plant is similar.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The tumbler apparatus further comprises a sensor that detects whether the housing is inserted or removed, monitors contents (e.g., determines if the contents contains any plants, metal, or other objects). An x-ray device can sample the contents or a camera can be used to video the contents. A temperature sensor can be used to monitor one or more temperatures. A laser can be implemented that cuts any remaining plant particles. Furthermore, a multi-directional conveyer coupled to the motor that receives instruction from central processing unit can be included.

What is claimed is:

1. A tumbler apparatus for a plant trimming device, comprising:
   a tumbler comprising a metal cylinder structure with a plurality of openings that allows plant leaves to protrude out from the metal cylinder structure and be cut;
   at least one brush residing adjacent to the tumbler that removes plant residue and oil from the tumbler;
   a motor coupled to the tumbler that rotates the tumbler so that plants inside rotate;
   a removable tumbler cartridge that contains the tumbler, wherein the cartridge containing the tumbler can be removed from and inserted into the plant trimming device;
   an adjustable tilt mechanism for tilting the removable tumbler cartridge inside the plant trimming device for optimal operation depending on the plants, wherein the plants are processed faster through the tumbler with a higher tilt and slower through the tumbler with a lower tilt.

2. The tumbler apparatus of claim 1 further comprising rails to guide insertion and removal of the removable tumbler cartridge containing the tumbler.

3. The tumbler apparatus of claim 1, wherein the motor is attached directly to the tumbler.

4. The tumbler apparatus of claim 1, wherein the motor is attached via a belt or chain to the tumbler.

5. The tumbler apparatus of claim 1 further comprising a handle attached to the removable tumbler cartridge that allows the tumbler to be moved.

6. The tumbler apparatus of claim 1 further comprising a sensor that detects whether the removable tumbler cartridge is inserted or removed.

7. The tumbler apparatus of claim 1 further comprising a sensor that monitors contents of the tumbler.

8. The tumbler apparatus of claim 7, wherein the sensor determines if the contents of the tumbler contains any plants, metal, or other objects.

9. The tumbler apparatus of claim 1 further comprising an x-ray device that samples contents of the tumbler.

10. The tumbler apparatus of claim 1 further comprising a camera that videos contents of the tumbler.

11. The tumbler apparatus of claim 1 further comprising a user controlled touch panel that allows the control of the system.

12. The tumbler apparatus of claim 1 further comprising a user interface screen.

13. The tumbler apparatus of claim 12 wherein the user interface screen shows status of components.

14. The tumbler apparatus of claim 1 further comprising a temperature sensor to monitor one or more temperatures.

15. The tumbler apparatus of claim 1 further comprising a laser that cuts any remaining plant particles.

16. The tumbler apparatus of claim 1 further comprising a central processing unit controls queuing and job management to manage job status for start, pause, halt, or finish of the job.

17. The tumbler apparatus of claim 16 further comprising at least one sensor coupled to the central processing unit to monitor temperature, moisture level, speed, fault, unidentified non-pant objects, and power of the system.

* * * * *